US011982245B2

(12) United States Patent
Inaba

(10) Patent No.: US 11,982,245 B2
(45) Date of Patent: May 14, 2024

(54) CONTROL APPARATUS FOR INTERNAL COMBUSTION ENGINE, RESIDUE REMOVAL METHOD, AND COMPUTER-READABLE RECORDING MEDIUM

(71) Applicant: SUBARU CORPORATION, Tokyo (JP)

(72) Inventor: Takumi Inaba, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 18/325,317

(22) Filed: May 30, 2023

(65) Prior Publication Data

US 2023/0399991 A1 Dec. 14, 2023

(30) Foreign Application Priority Data

Jun. 13, 2022 (JP) ................................ 2022-094831

(51) Int. Cl.
*F02D 41/02* (2006.01)
*F02D 41/12* (2006.01)

(52) U.S. Cl.
CPC .... *F02D 41/025* (2013.01); *F02D 2200/0802* (2013.01)

(58) Field of Classification Search
CPC ................. F02D 41/025; F02D 41/123; F02D 2200/0802
See application file for complete search history.

(56) References Cited

U.S. PATENT DOCUMENTS

2005/0076637 A1* 4/2005 Odendall ............. F02D 41/025 60/284

FOREIGN PATENT DOCUMENTS

JP 2019-44670 A 3/2019

* cited by examiner

*Primary Examiner* — Phutthiwat Wongwian
*Assistant Examiner* — Arnold Castro
(74) *Attorney, Agent, or Firm* — Rimon P.C.

(57) ABSTRACT

A control apparatus for an internal combustion engine configured to perform control to remove a combustible residue adhered to an exhaust path of the internal combustion engine includes one or more processors and one or more memories communicatively coupled to the one or more processors. The one or more processors are configured to: obtain information on an exhaust temperature at a predetermined position in the exhaust path during operation of the internal combustion engine; determine whether the exhaust temperature or a predetermined reference temperature obtained based on the exhaust temperature has exceeded a threshold; and, when the exhaust temperature or the reference temperature has exceeded the threshold, increase an amount of oxygen to be supplied to the exhaust path to forcibly combust the combustible residue.

10 Claims, 3 Drawing Sheets

CONTROL APPARATUS FOR INTERNAL COMBUSTION ENGINE, RESIDUE REMOVAL METHOD, AND COMPUTER-READABLE RECORDING MEDIUM

CROSS-REFERENCE TO RELATED APPLICATIONS

The present application claims priority from Japanese Patent Application No. 2022-094831 filed on Jun. 13, 2022, the entire contents of which are hereby incorporated by reference.

BACKGROUND

The disclosure relates to a control apparatus for an internal combustion engine, a residue removal method, and a computer-readable recording medium.

Vehicles equipped with internal combustion engines are equipped with systems for purifying exhaust gases discharged from the internal combustion engines. For example, ternary catalysts and particulate filters are provided in the exhaust path of gasoline engines to purify exhaust gases by decomposing specific components in the exhaust gases and collecting particulate matters, and to release the purified exhaust gases into the atmosphere.

For example, Japanese Unexamined Patent Application Publication No. 2019-44670 discloses technology of the related art.

SUMMARY

An aspect of the disclosure provides a control apparatus for an internal combustion engine. The control apparatus is configured to control to remove a combustible residue adhered to an exhaust path of the internal combustion engine, the control apparatus including one or more processors and one or more memories communicatively coupled to the one or more processors. The one or more processors are configured to: obtain information on an exhaust temperature at a predetermined position in the exhaust path during operation of the internal combustion engine; determine whether the exhaust temperature or a predetermined reference temperature obtained based on the exhaust temperature has exceeded a threshold; and, when the exhaust temperature or the reference temperature has exceeded the threshold, increase an oxygen supply amount of oxygen supplied to the exhaust path to forcibly combust the combustible residue. The oxygen supply amount is an amount of oxygen to be supplied to the exhaust path amount.

An aspect of the disclosure provides a method of removing a combustible residue adhered to an exhaust path of an internal combustion engine. The method includes: when an exhaust temperature at a predetermined position in the exhaust path during operation of the internal combustion engine or a predetermined reference temperature obtained based on the exhaust temperature has exceeded a threshold, increasing an amount of oxygen to be supplied to the exhaust path to forcibly combust the combustible residue.

An aspect of the present disclosure provides a non-transitory computer-readable recording medium containing a program applicable to a control apparatus for an internal combustion engine, the program causing, when executed by one or more processors, the one or more processors to implement processing, the processing including: obtaining information on an exhaust temperature at a predetermined position in an exhaust path of the internal combustion engine during operation of the internal combustion engine; determining whether the exhaust temperature or a predetermined reference temperature obtained based on the exhaust temperature has exceeded a threshold; and, when the exhaust temperature or the reference temperature has exceeded the threshold, increasing an amount of oxygen to be supplied to the exhaust path to forcibly combust a residue adhered to the exhaust path.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
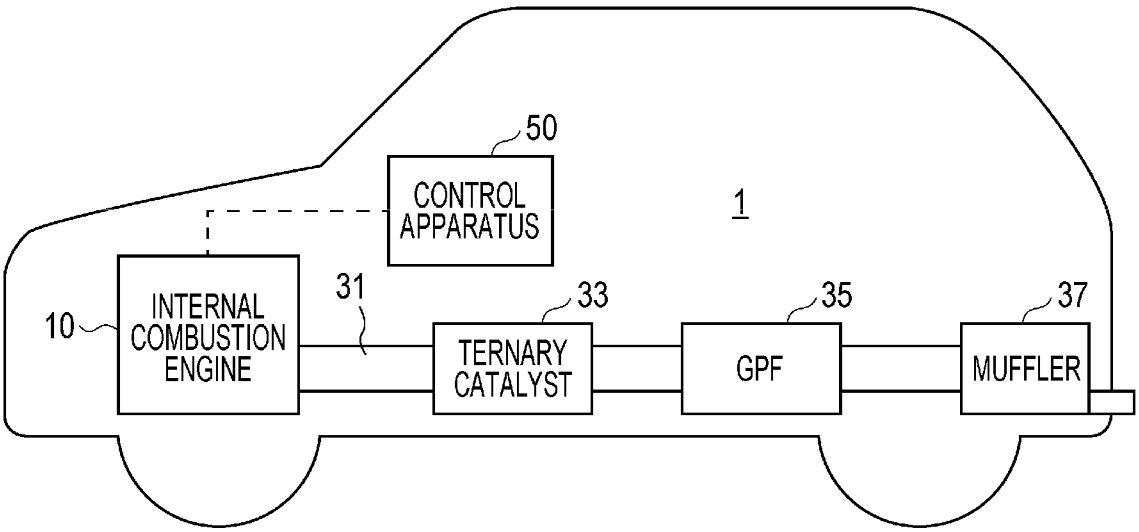
FIG. 1 is a block diagram illustrating an example of the configuration of an exhaust system of an internal combustion engine to which technology of the disclosure is applicable.

Here, in the process of producing vehicles equipped with internal combustion engines, quality confirmation inspections are conducted to check whether the concentration of a specific component in the exhaust gas released into the atmosphere is less than or equal to a certain standard. If the above exhaust purification system is functioning normally, no abnormalities are identified in the above inspections. However, combustible substances may remain in the exhaust path of the internal combustion engines in the process of producing vehicles. For example, a processing oil used in molding exhaust pipes or iron powder generated during processing may be left in the exhaust path, or members that are supposed to be combusted in the production process may be left in the exhaust path due to incomplete combustion.

If such residues are present, even though there are no abnormalities in the internal combustion engines and the exhaust purification systems, abnormalities may be identified in the above inspections due to the residues being combusted and discharged with the exhaust gases. In particular, if residues are present downstream of catalysts and/or particulate filters for purifying the exhaust, it may not be possible to remove certain components that are generated by the combustion of the residues. Accordingly, when quality confirmation inspections are conducted while such components are being generated, abnormalities may be identified despite there being no abnormalities with the internal combustion engines and the exhaust purification systems.

It is desirable to provide a control apparatus for an internal combustion engine capable of combusting a combustible residue present in an exhaust path of the internal combustion engine and reducing its impact on quality confirmation inspections, a residue removal method, and a computer-readable recording medium.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Example of Configuration of Exhaust System of Internal Combustion Engine

First, an example of the configuration of an exhaust system of an internal combustion engine to which a control apparatus for an internal combustion engine according to an embodiment of the disclosure is applicable will be described.

Figure 2:
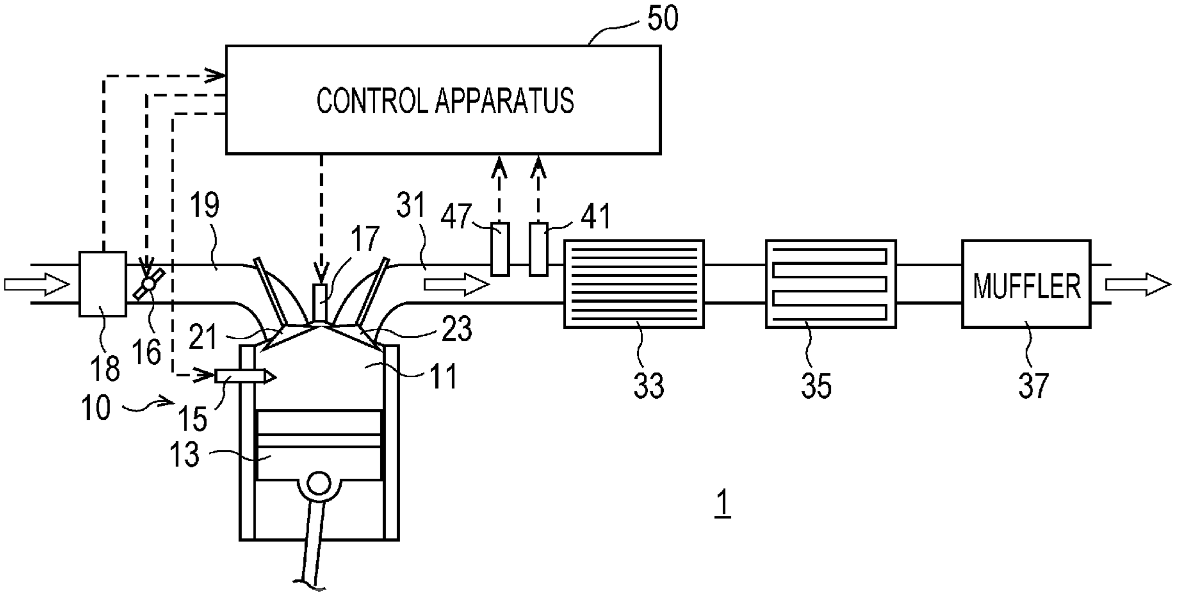
FIG. 2 is a schematic diagram illustrating, for example, an example of the configuration of the exhaust system of the internal combustion engine.

FIG. 1 is an explanatory diagram illustrating an example of the configuration of an exhaust system 1 of an internal combustion engine 10 mounted on a vehicle, and FIG. 2 is a schematic diagram illustrating, for example, the exhaust system 1 of the internal combustion engine 10. The exhaust system 1 of the internal combustion engine 10 includes an exhaust path 31 through which an exhaust gas discharged from the internal combustion engine 10 passes, and a ternary catalyst 33, a gasoline particulate filter (GPF) 35, and a muffler (silencer) 37 provided in the exhaust path 31. Although the ternary catalyst 33 is provided upstream of the GPF 35 in the illustrated example, the GPF 35 may be provided upstream of the ternary catalyst 33.

The internal combustion engine 10 includes a cylinder 11, a piston 13, an intake valve 21, an exhaust valve 23, a fuel injection valve 15, and a spark plug 17. The piston 13 moves up and down in the cylinder 11. The intake valve 21 is provided at an opening of an intake passage 19 facing the cylinder 11. The exhaust valve 23 is provided at an opening of the exhaust path 31 facing the cylinder 11. The fuel injection valve 15 and the spark plug 17 are provided so that their tips face into the cylinder 11. The driving of the fuel injection valve 15 and the spark plug 17 is controlled by a control apparatus 50.

The intake passage 19 is provided with an air mass sensor 18 and an intake throttle valve 16. The intake throttle valve 16 is driven by the control apparatus 50 and regulates the flow rate of intake air supplied to the cylinder 11. The air mass sensor 18 detects the flow rate of intake air. A sensor signal of the air mass sensor 18 is transmitted to the control apparatus 50.

In the internal combustion engine 10, when the piston 13 is lowered, the intake valve 21 is opened to intake air from the intake passage 19 to the cylinder 11, and fuel is injected from the fuel injection valve 15 to form an air mixture in the cylinder 11 (intake process). When the piston 13 rises the next time, the intake valve 21 is closed, and the formed air mixture is compressed (compression process). The compressed air mixture is ignited by the spark plug 17 to expand and push the piston 13 down (expansion process). When the piston 13 rises the next time, the exhaust valve 23 is opened, and a combustion gas (exhaust) is discharged into the exhaust path 31 (exhaust process).

The exhaust path 31 is provided with the ternary catalyst 33 and the GPF 35. The ternary catalyst 33 is an oxygen absorption and releasing catalyst, and oxidizes or reduces hydrocarbons (HC), carbon monoxides (CO) and nitrogen oxides (NOx) in the exhaust. For example, the ternary catalyst 33 adsorbs oxygen in the exhaust when the exhaust is rich, and releases the adsorbed oxygen when the exhaust is lean, thereby purifying HC, CO, NOx, etc. in the exhaust.

The GPF 35 is configured to, for example, carry a catalytic component on the surface of a ceramic honeycomb-like filter carrier. The GPF 35 collects a particulate matter (PM) contained in the exhaust. The PM collected by the GPF 35 is oxidized, combusted, and removed during operation of the internal combustion engine 10 when the GPF is in a certain high temperature state and oxygen is supplied to the GPF 35. In the present embodiment, the GPF is configured as an oxygen absorption and releasing filter, and also serves as a ternary catalyst to oxidize or reduce HC, CO, and NOx in the exhaust. By allowing not only the ternary catalyst 33 but also the GPF 35 to serve as a ternary catalyst, the efficiency of purifying the exhaust is enhanced.

The muffler 37 is a device for reducing the exhaust sound. A partition plate for reducing the sound pressure is provided inside the muffler 37, and the interior of the muffler 37 is filled with a sound dampening material such as glass wool.

The exhaust path 31 is provided with a pressure sensor 41 and an exhaust temperature sensor 47. The pressure sensor 41 and the exhaust temperature sensor 47 are provided upstream of the ternary catalyst 33. The pressure sensor 41 detects the exhaust pressure. The exhaust temperature sensor 47 detects the exhaust temperature. Sensor signals of the pressure sensor 41 and the exhaust temperature sensor 47 are transmitted to the control apparatus 50. The positions at which the pressure sensor 41 and the exhaust temperature sensor 47 are disposed are not particularly limited. In addition, an air-fuel ratio sensor or an oxygen concentration sensor may be provided at an appropriate position in the exhaust path 31.

2. Control Apparatus for Internal Combustion Engine

The control apparatus 50 is configured of one or more processors, such as a central processing unit (CPU), and one or more memories, such as random access memory (RAM) or read only memory (ROM), communicatively coupled to the processor(s). The control apparatus 50 may be partially or entirely configured of updateable software such as firmware, or may be a program module or the like executed in response to a command from the processor(s).

By executing a computer program by the processor(s), the control apparatus 50 serves as an apparatus configured to remove a residue present in the exhaust path 31 after the production of the vehicle or the repair and replacement of the exhaust system 1. The computer program is a computer program for causing the processor(s) to execute a later-described operation to be executed by the control apparatus 50. The computer program executed by the processor(s) may be recorded in a recording medium that serves as a storage unit (memory) 59 provided in the control apparatus 50, or may be recorded in a recording medium included in the control apparatus 50 or in any recording medium externally attachable to the control apparatus 50.

The recording medium for recording the computer program may be a magnetic medium such as a hard disk, a floppy disk, a magnetic tape, or the like; an optical recording medium such as a compact disk read only memory (CD-ROM), a digital versatile disk (DVD), and a Blu-ray (registered trademark); a magneto-optical medium such as a floptical disk; a storage element such as RAM and ROM; a flash memory such as a Universal Serial Bus (USB) memory; or any other medium capable of storing the program.

A residue is a combustible substance remaining in the exhaust path 31 after the production of the vehicle or the repair and replacement of the exhaust system 1, and is combusted by a high-temperature exhaust gas discharged during operation of the internal combustion engine 10. Therefore, when an inspection (quality confirmation inspection) is conducted to check whether the concentration of a specific component in the exhaust gas released into the atmosphere is less than or equal to a certain standard after the vehicle production process or the repair and replacement of the exhaust system 1, an abnormality may be identified due to the component contained in the combustion gas of the residue. The control apparatus 50 permits the execution of a quality confirmation inspection after forcibly combusting and removing the residue prior to executing the quality confirmation inspection.

Figure 3:
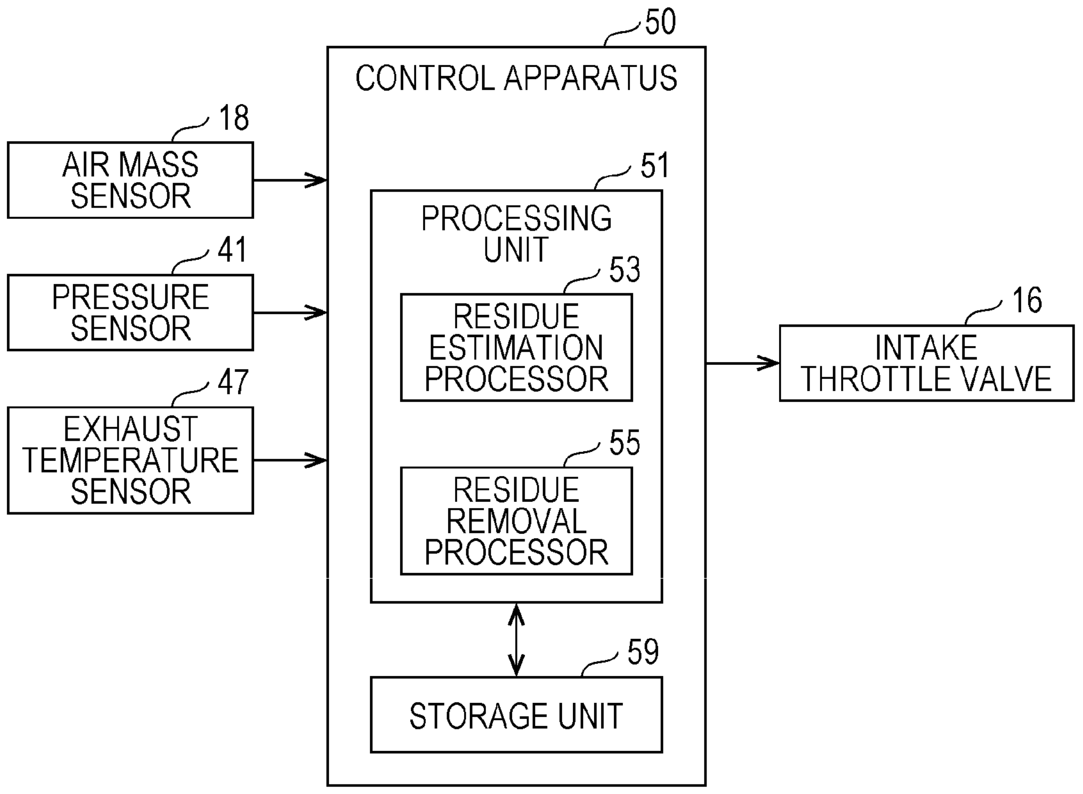
FIG. 3 is a block diagram illustrating an example of the configuration of a control apparatus for an internal combustion engine according to an embodiment of the disclosure.

FIG. 3 is an explanatory diagram illustrating the functional configuration related to a process of removing a residue, among configurations of the control apparatus 50. The control apparatus 50 includes a processing unit 51 and the storage unit (memory) 59. The processing unit 51 is configured of one or more processors. The processing unit 51 includes a residue estimation processor 53 and a residue removal processor 55. The residue estimation processor 53 and the residue removal processor 55 are functions realized by the execution of a computer program by the processor(s). Note that the processing unit 51 may be partially configured of hardware such as an analog circuit.

The control apparatus 50 is coupled to the air mass sensor 18, the pressure sensor 41, the exhaust temperature sensor 47, the fuel injection valve 15, the intake throttle valve 16, and the spark plug 17 via dedicated lines or a communication means such as a controller area network (CAN) or a local Internet (LIN). The control apparatus 50 is configured to be able to obtain, besides sensor signals of the air mass sensor 18, the pressure sensor 41, and the exhaust temperature sensor 47, various sensor signals of sensors such as an accelerator sensor or messages from other control apparatuses. The control apparatus 50 is also configured to be able to transmit drive signals to the fuel injection valve 15, the intake throttle valve 16, and the spark plug 17.

Storage Unit

The storage unit 59 includes a storage element such as RAM or ROM. The storage unit 59 may include other storage devices such as a hard disk drive (HDD) or a solid state drive (SSD). The storage unit 59 stores a computer program executed by the processor(s), various parameters used in arithmetic processing, state values corresponding to the obtained sensor signals, or the results of the arithmetic processing.

Residue Estimation Processor

The residue estimation processor 53 executes a process of estimating a residue remaining in the exhaust path 31 after the production of the vehicle or the repair and replacement of the exhaust system 1. In the present embodiment, data on the type and amount of combustible adhered to components used for producing the exhaust system 1 is recorded in advance in the storage unit 59, and the residue estimation processor 53 refers to the recorded data to estimate a residue remaining in the exhaust path 31. Information on the type of combustible is necessary for estimating the combustion temperature (e.g. ignition point) at which the residue (combustible) is to be combusted. In addition, the amount of combustible is necessary for determining the necessity of executing the process of combusting the residue and estimating the time (i.e., combustion time) or the amount of oxygen necessary for removing the residue.

Examples of residues include a processing oil used in molding exhaust pipes, iron powder generated during processing, or tapes and bags that hold glass wool disposed inside the muffler 37. The amount of residual processing oil can be estimated for each component or determined by analysis in advance. The amount of residual iron powder can be estimated for each component or determined by analysis in advance. In addition, the amount of tapes and bags that hold glass wool can be grasped in advance. Accordingly, the residue estimation processor 53 can obtain the type and amount of residue by referring to the data stored in the storage unit 59 in advance.

The residue estimation processor 53 may also estimate the amount of residue by subtracting the reduction amount of residue estimated based on the operating state of the internal combustion engine 10 until the residue is estimated, from the amount of residue remaining in the exhaust path 31 after the production of the vehicle or the repair and replacement of the exhaust system 1. For example, based on the amount of oxygen supplied from the internal combustion engine 10 to the exhaust path 31 and the exhaust temperature before executing a process of increasing the amount of oxygen supplied to the exhaust path 31 after the production of the vehicle or the repair and replacement of the exhaust system 1, the residue estimation processor 53 estimates the time that the residue has been in a state of spontaneous ignition and combustion, and estimates the reduction amount of residue. The exhaust temperature may be a temperature detected by the exhaust temperature sensor 47, or may be a temperature estimated based on the operating state of the internal combustion engine 10. Then, by subtracting the estimated reduction amount of residue from the residual amount of residue remaining in the exhaust path 31 after the production of the vehicle or the repair and replacement of the exhaust system 1, the residue estimation processor 53 can obtain the amount of residue remaining in the exhaust path 31.

The combustion temperature or evaporative combustion temperature of each residue can be grasped in advance according to the type of residue. For example, the flash point of lubricating oil used for press processing is about 120° C. to 350° C., and the spontaneous ignition point thereof is about 250° C. to 350° C. The spontaneous ignition point of iron powder is about 315° C. to 320° C., and the spontaneous ignition point of tapes and bags is determined by their materials. Note that combustible residues are not limited to the above examples.

Residue Removal Processor

The residue removal processor 55 obtains information on an exhaust temperature at a predetermined position in the exhaust path 31 during operation of the internal combustion engine 10, and, when the exhaust temperature or a predetermined reference temperature obtained based on the exhaust temperature has exceeded a threshold (hereinafter may also be referred to as a "combustion temperature threshold"), executes a process of increasing the amount of oxygen supplied to the exhaust path 31 to forcibly combust the residue (hereinafter may also referred to as a "forced combustion process"). The residue removal processor 55 permits the execution of a quality confirmation inspection after executing the forced combustion process of the residue. In other words, the residue removal processor 55 executes a process of promoting the combustion of the residue in advance so that no quality confirmation inspection will be conducted with the residue being adhered to the exhaust path 31.

In the present embodiment, the residue removal processor 55 calculates a residue determination value based on the type and amount of residue estimated by the residue estimation processor 53 after the assembly of the internal combustion engine 10 and the exhaust system 1, that is, after the production of the vehicle. In addition, when the residue determination value exceeds a predetermined residue reference value, the residue removal processor 55 executes the above-mentioned forced combustion process of the residue. For example, based on the type and amount of residue, the amount of generation of a predetermined specific component that is subjected to quality confirmation inspection can be estimated. A typical specific component is, for example, a particulate matter (PM), but may be other components. If the residue adheres to a position downstream of the GPF 35, the generated PM will be released into the atmosphere with the exhaust gas.

Then, using the estimated amount of generation of a specific component as the residue determination value, when the residue determination value exceeds the residue reference value, the residue removal processor 55 determines that there is an impact on the quality confirmation inspection, and executes the forced combustion process of the residue. The residue reference value may be set in any manner in consideration of the value at which the concentration of a specific component in the exhaust gas may be determined to be an abnormal concentration in the quality confirmation inspection.

The combustion temperature threshold is set based on the combustion temperature (i.e., ignition point) of the residue. In one example, the residue removal processor 55 sets a combustion temperature threshold that takes into consideration the state inside the exhaust path 31 based on information on the combustion temperature of the residue and information on the exhaust pressure in the exhaust path 31 detected by the pressure sensor 41. For example, based on the flash point or spontaneous ignition point of the residue under atmospheric pressure, the higher the detected exhaust pressure in the exhaust path 31, the lower the combustion temperature threshold is set below the flash point or spontaneous ignition point. If multiple residues are present and each residue is to be combusted and removed, the residue removal processor 55 may set a combustion temperature threshold based on the combustion temperature of each residue. Alternatively, if multiple residues are present and all the residues are to be combusted and removed at the same time, the residue removal processor 55 may set a combustion temperature threshold based on the combustion temperature of the residue with the highest combustion temperature.

As illustrated in FIG. 2, in the present embodiment, the exhaust temperature sensor 47 is provided upstream of the ternary catalyst 33 in the exhaust path 31 of the internal combustion engine 10, and the residue removal processor 55 determines whether an exhaust temperature (detected temperature) detected by the exhaust temperature sensor 47 or a predetermined reference temperature obtained based on the detected temperature exceeds the combustion temperature threshold. For example, the correlation between the detected temperature detected by the exhaust temperature sensor 47 and the temperature of a region where the residue has adhered can be estimated, taking into consideration a temperature rise of the ternary catalyst 33 and the GPF 35 according to the elapsed time since the start of the internal combustion engine 10, the operating state, etc. Accordingly, the residue removal processor 55 determines whether the temperature (reference temperature) of the region where the residue has adhered, which is estimated based on the detected temperature detected by the exhaust temperature sensor 47, exceeds the combustion temperature threshold set based on the combustion temperature of the residue and the exhaust pressure in the exhaust path 31. Alternatively, the residue removal processor 55 may use the value of the detected temperature at which the temperature of the region where the residue has adhered exceeds the combustion temperature threshold as a threshold, and determine whether the detected temperature exceeds the threshold.

When the reference temperature exceeds the combustion temperature threshold, the residue removal processor 55 increases the amount of oxygen supplied to the exhaust path 31 to combust the residue. In the present embodiment, the residue removal processor 55 increases the amount of intake air to the internal combustion engine 10 by increasing the opening of the intake throttle valve 16 during a fuel cut in which the fuel supply is stopped during operation of the internal combustion engine 10, and increases the amount of oxygen supplied to the exhaust path 31 via the cylinders of the internal combustion engine 10. For example, during a test run prior to a quality confirmation inspection of the vehicle, when the accelerator pedal is suddenly released from a depressed state (so-called coast traveling state) and the fuel is cut off, the residue removal processor 55 increases the opening of the intake throttle valve 16. This increases the amount of oxygen supplied to the exhaust path 31 and promotes the combustion of the residue, thereby quickly removing the residue.

At this time, when the deceleration rate of the vehicle does not reach a target deceleration rate due to the increase in the opening of the intake throttle valve 16, the deceleration rate may be compensated by generating a hydraulic brake and/or a regenerative brake through cooperative control with a brake control device.

Note that the method of increasing the amount of oxygen supplied to the exhaust path 31 is not limited to the method of increasing the opening of the intake throttle valve 16 during a fuel cut. For example, an air supply device may be provided to supply air into the exhaust path 31, and, when the detected temperature exceeds the combustion temperature threshold, air may be supplied into the exhaust path 31 regardless of the operating state of the internal combustion engine 10.

The residue removal processor 55 performs a process of increasing the amount of oxygen supply until the amount of unburned residue becomes less than or equal to a predetermined value. The process of increasing the oxygen supply amount may be completed in a single consecutive process, or may be performed intermittently each time the vehicle enters a coast traveling state. The residue removal processor 55 terminates the forced combustion process when the integrated value of the amount of oxygen supplied to the exhaust path 31, which is estimated based on the amount of intake air detected by the air mass sensor 18, reaches a termination threshold set as an amount necessary for combusting the estimated residue. The termination threshold for the oxygen supply amount may be a fixed value set in advance. Alternatively, the residue removal processor 55 may set a threshold for the time of executing the process based on the estimated amount of residue and terminate the forced combustion process when the integrated value of the time of executing the process of increasing the oxygen supply amount reaches the threshold for the execution time, or may terminate the forced combustion process when the integrated value of the time of executing the process of increasing the oxygen supply amount reaches a preset reference time.

Upon completion of a forced combustion process of increasing the oxygen supply amount to combust the residue, the residue removal processor 55 prohibits the execution of the forced combustion process and sets a flag permitting the execution of a quality confirmation inspection. This makes it possible to conduct a quality confirmation inspection, and to prevent an abnormality from being identified due to a residue in the quality confirmation inspection. The quality confirmation inspection is conducted, for example, by determining whether the concentration of a specific component in the exhaust gas released into the atmosphere from the internal combustion engine 10 when the vehicle is driven with a preset accelerator pattern and brake pattern is less than or equal to a certain standard. If the forced combustion process of the residue is executed before a quality verification inspection after the production of the vehicle and the execution of the forced combustion process is prohibited, and if the residue determination value exceeds the residue reference value again after the repair and replacement of the internal combustion engine 10 or the exhaust system 1, the prohibition of the execution of the forced combustion process of the residue is lifted and the execution of the forced combustion process is permitted.

3. Operation

Next, the processing operation of the control apparatus for the internal combustion engine 10 according to the present embodiment will be described.

Figure 4:
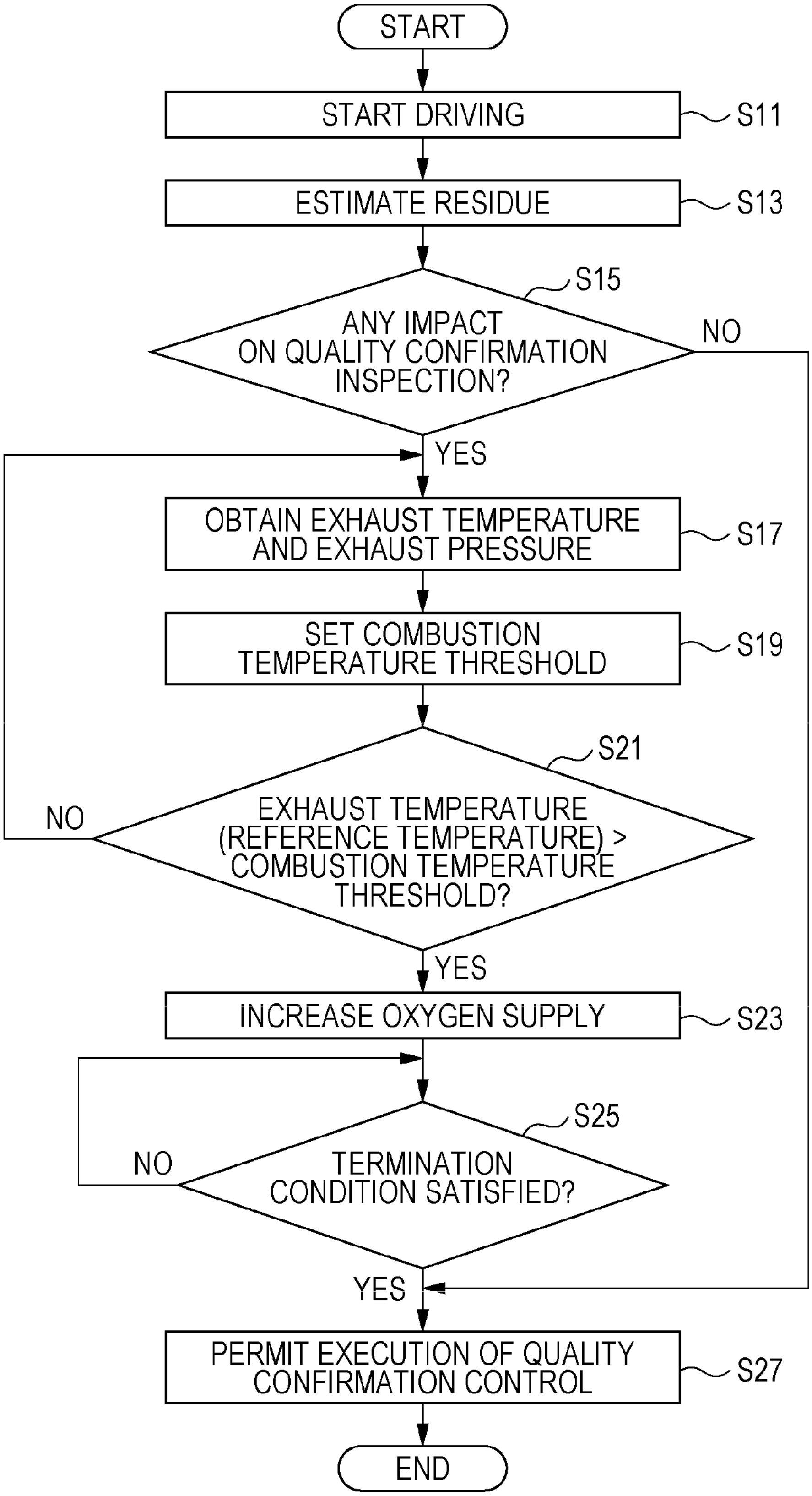
FIG. 4 is a flowchart illustrating an example of the processing operation of the control apparatus for the internal combustion engine according to the embodiment.

FIG. 4 is a flowchart illustrating the processing operation of the processing unit 51 of the control apparatus 50.

First, after detecting that the vehicle has started traveling (step S11), the residue estimation processor 53 estimates a residue remaining in the exhaust path 31 (step S13). In one example, upon detection that the vehicle has started traveling with no completion flag of a quality confirmation inspection being set, the residue estimation processor 53 refers to information on the type and amount of residue that may be adhered to the exhaust path 31, which is stored in the storage unit 59, and estimates the type and amount of residue remaining in the exhaust path 31. The residue estimation processor 53 may estimate the amount of residue by subtracting the reduction amount of residue estimated based on the operating state of the internal combustion engine 10 until the residue is estimated, from the amount of residue remaining in the exhaust path 31 after the production of the vehicle or the repair and replacement of the exhaust system 1.

For example, based on the amount of oxygen supplied from the internal combustion engine 10 to the exhaust path 31 and the exhaust temperature after the production of the vehicle or the repair and replacement of the exhaust system 1, the residue estimation processor 53 estimates the time that each residue has been in a state of spontaneous ignition and combustion, and estimates the reduction amount of each residue. The exhaust temperature may be a temperature detected by the exhaust temperature sensor 47, or may be a temperature estimated based on the operating state of the internal combustion engine 10. Then, the residue estimation processor 53 subtracts the estimated reduction amount of residue from the residual amount of residue remaining in the exhaust path 31 after the production of the vehicle or the repair and replacement of the exhaust system 1, thereby obtaining the amount of each residue remaining in the exhaust path 31.

Next, the residue removal processor 55 determines whether the residue obtained by the residue estimation processor 53 has any impact on a quality confirmation inspection (step S15). In one example, the residue removal processor 55 estimates the amount of generation of a predetermined specific component that is subjected to quality confirmation inspection based on the type and amount of residue, and sets the estimated amount as a residue determination value. Then, the residue removal processor 55 determines that the residue has an impact on a quality confirmation inspection when the residue determination value exceeds a residue reference value set in consideration of the value at which the concentration of a specific component in the exhaust gas may be determined to be an abnormal concentration in the quality confirmation inspection. When there are multiple specific components, the residue removal processor 55 obtains the residue determination value for each specific component and compares it with the residue reference value.

If it is determined that the residue has no impact on a quality confirmation inspection (S15/No), the residue removal processor 55 permits the execution of a quality confirmation inspection (step S25). In contrast, if it is determined that the residue has an impact on a quality confirmation inspection (S15/Yes), the residue removal processor 55 obtains information on the exhaust temperature and exhaust pressure (step S17). In the present embodiment, the residue removal processor 55 detects the exhaust temperature and the exhaust pressure based on sensor signals of the exhaust temperature sensor 47 and the pressure sensor 41, respectively. Instead of using the exhaust temperature sensor 47 and the pressure sensor 41, the exhaust temperature and the exhaust pressure may be estimated based on the operating state of the internal combustion engine 10.

Next, the residue removal processor 55 sets a combustion temperature threshold for determining whether to start executing a forced combustion process of increasing the oxygen supply amount to combust the residue (step S19). In one example, the residue removal processor 55 sets a combustion temperature threshold that takes into consideration the state within the exhaust path 31 based on information on the estimated exhaust pressure and information on the combustion temperature of the residue. The combustion temperature threshold is set based on the flash point or spontaneous ignition point of the residue under atmospheric pressure so that the higher the exhaust pressure, the lower the combustion temperature threshold is below the flash point or spontaneous ignition point. For example, for each type of residue, a map of flash points or spontaneous ignition points that depend on pressure and temperature may be stored in the storage unit 59, and the residue removal processor 55 may set a combustion temperature threshold with reference to the map. If multiple residues are present and each residue is to be combusted and removed, the residue removal processor 55 may set a combustion temperature threshold based on the combustion temperature of each residue. Alternatively, if multiple residues are present and all the residues are to be combusted and removed at the same time, the residue removal processor 55 may set a combustion temperature threshold based on the combustion temperature of the residue with the highest combustion temperature.

Next, the residue removal processor 55 determines whether the exhaust temperature (detected temperature)

detected by the exhaust temperature sensor 47 or a predetermined reference temperature obtained based on the detected temperature has exceeded the combustion temperature threshold (step S21). Here, it is determined whether the execution of a forced combustion process can be started. For example, the residue removal processor 55 takes into consideration a temperature rise of the ternary catalyst 33 and the GPF 35 according to the elapsed time since the start of the internal combustion engine 10, the operating state, etc. to estimate the temperature (reference temperature) of a region where the residue has adhered based on the detected temperature detected by the exhaust temperature sensor 47, and determines whether the reference temperature has exceeded the combustion temperature threshold. Alternatively, the residue removal processor 55 may use the value of the detected temperature at which the temperature of the region where the residue has adhered exceeds the combustion temperature threshold as a threshold, and determine whether the exhaust temperature (detected temperature) exceeds the threshold.

If it is not determined that the above reference temperature has exceeded the combustion temperature threshold (S21/No), the residue removal processor 55 returns to step S17, where a determination as to whether the execution of a forced combustion process can be started is repeatedly executed. In contrast, if it is determined that the above reference temperature has exceeded the combustion temperature threshold (S21/Yes), the residue removal processor 55 executes a process of increasing the amount of oxygen supplied to the exhaust path 31 (step S23). In the present embodiment, when the vehicle enters a coast traveling state and the fuel supply to the internal combustion engine 10 is cut off, the residue removal processor 55 increases the amount of intake air to the internal combustion engine 10 by increasing the opening of the intake throttle valve 16, and increases the amount of oxygen supplied to the exhaust path 31. This promotes the combustion of the residue and allows the residue to be removed quickly. At this time, when the deceleration rate of the vehicle does not reach a target deceleration rate due to the increase in the opening of the intake throttle valve 16, the deceleration rate may be compensated by generating a hydraulic brake and/or a regenerative brake through cooperative control with a brake control device.

Next, the residue removal processor 55 determines whether a condition for terminating the forced combustion process has been satisfied (step S25). For example, the residue removal processor 55 terminates the forced combustion process when the integrated value of the amount of oxygen supplied to the exhaust path 31, which is estimated based on the amount of intake air detected by the air mass sensor 18, reaches a termination threshold set as an amount necessary for combusting the estimated residue. The termination threshold for the oxygen supply amount may be a fixed value set in advance. Alternatively, the residue removal processor 55 may set a threshold for the time of executing the process based on the estimated amount of residue and terminate the process when the integrated value of the time of executing the process of increasing the oxygen supply amount reaches the threshold for the execution time, or may terminate the process when the integrated value of the time of executing the process of increasing the oxygen supply amount reaches a preset reference time.

The residue removal processor 55 repeats the determination of step S25 until it is determined that the condition for terminating the forced combustion process has been satisfied (S25/No). Then, if it is determined that the condition for terminating the forced combustion process has been satisfied (S25/Yes), the residue removal processor 55 sets a completion flag of the forced combustion process to prohibit the execution of a forced combustion process, and also sets a flag for permitting the execution of a quality confirmation inspection (step S27). This makes it possible to conduct a quality confirmation inspection, and to prevent an abnormality from being identified due to a residue in the quality confirmation inspection.

As described above, according to the control apparatus 50 for the internal combustion engine 10 according to the present embodiment, when an exhaust temperature at a predetermined position in the exhaust path 31 or a predetermined reference temperature obtained based on the exhaust temperature has exceeded the combustion temperature threshold during operation of the internal combustion engine 10 after the production of the vehicle or the repair and replacement of the exhaust system 1, a forced combustion process is executed to increase the amount of oxygen supplied to the exhaust path 31 to forcibly combust the residue. Therefore, the residue can be reduced before a quality confirmation inspection is executed, and the residue's impact on a quality confirmation inspection can be reduced. This prevents the result of the quality confirmation inspection from being determined to be abnormal even though there are no abnormalities in the internal combustion engine 10 and the exhaust purification system.

In addition, the control apparatus 50 for the internal combustion engine 10 according to the present embodiment executes a forced combustion process when a residue determination value calculated based on information on the type and amount of residue that may be adhered to the individual components constituting the exhaust system 1 exceeds a predetermined residue reference value. Therefore, when the amount of residue is small, no forced combustion process is executed, and the execution of a quality confirmation inspection is permitted promptly.

Moreover, the control apparatus 50 for the internal combustion engine 10 according to the present embodiment sets a combustion temperature threshold based on the flash point or spontaneous ignition point according to the type of residue adhered to the exhaust path 31 and the exhaust pressure, and executes a forced combustion process when the exhaust temperature or the reference temperature exceeds the combustion temperature threshold. Therefore, increasing the amount of oxygen supplied to the exhaust path 31 increases the certainty that combustion of the residue will be promoted, and the residue can be efficiently removed.

In addition, the control apparatus 50 for the internal combustion engine 10 according to the present embodiment terminates the forced combustion process when the integrated value of the oxygen supply amount after increasing the oxygen supply amount reaches a termination threshold. This prevents the residue from remaining for a certain time or longer to impact the quality confirmation inspection even after the completion of the forced combustion process, and also prevents the execution time of the forced combustion process from becoming excessively long.

Furthermore, the control apparatus 50 for the internal combustion engine 10 according to the present embodiment increases the amount of intake air to the internal combustion engine 10 by increasing the opening of the intake throttle valve 16 when the vehicle enters a coast traveling state and the fuel supply to the internal combustion engine 10 is cut off, thereby increasing the amount of oxygen supplied to the exhaust path 31. This allows the residue to be forcibly combusted without the addition of a special device for supplying oxygen into the exhaust path 31.

While the preferred embodiment of the disclosure has been described in detail above with reference to the accompanying drawings, the disclosure is not limited to such examples. It is clear for those who have ordinary knowledge in the art to which the disclosure pertains to be able to conceive of various changes or modifications within the scope of the technical ideas described in the claims, and it is understood that these also naturally fall within the technical scope of the disclosure.

For example, although the amount of generation of a predetermined specific component that is subjected to quality confirmation inspection, which is estimated based on the type and amount of residue, has been used as the residue determination value in the above-described embodiment, the residue determination value is not limited to this example. Whether the residue determination value exceeds the residue reference value may be determined by using, for each type of residue, the amount of residue as the residue determination value, and using the amount of residue corresponding to the amount of generation of the specific component that may be determined to be abnormal in the quality confirmation inspection as the residue reference value. Even in doing so, when the amount of residue is small, no forced combustion process is executed, and the execution of a quality confirmation inspection is permitted promptly.

As described above, according to the disclosure, combustible residues present in the exhaust path of the internal combustion engine can be combusted to reduce their impact on quality confirmation inspections.

The control apparatus 50 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control apparatus 50 including the residue estimation processor 53 and the residue removal processor 55. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A control apparatus for an internal combustion engine, the control apparatus being configured to perform control to remove a combustible residue adhered to an exhaust path of the internal combustion engine, the control apparatus comprising:
- one or more processors and one or more memories communicatively coupled to the one or more processors,
- the one or more processors being configured to
  - obtain information on an exhaust temperature at a predetermined position in the exhaust path during operation of the internal combustion engine,
  - determine whether the exhaust temperature or a predetermined reference temperature obtained based on the exhaust temperature has exceeded a threshold, and
  - when the exhaust temperature or the reference temperature has exceeded the threshold, increase an oxygen supply amount to forcibly combust the combustible residue, the oxygen supply amount being an amount of oxygen to be supplied to the exhaust path amount.

2. The control apparatus for the internal combustion engine according to claim 1, wherein
- the one or more processors are configured to
  - obtain information on a type of potential residue and an amount of the potential residue, the potential residue being residue that is likely to be adhered to the exhaust path,
  - calculate a residue determination value based on the type and the amount, and
  - when the residue determination value exceeds a predetermined residue reference value, execute a process of forcibly combusting the combustible residue.

3. The control apparatus for the internal combustion engine according to claim 2, wherein
- the one or more processors are configured to
  - execute the process of forcibly combusting the combustible residue when the residue determination value exceeds the predetermined residue reference value before execution of a confirmation inspection on the residue determination value after assembly of the internal combustion engine and the exhaust path,
  - prohibit execution of the process of forcibly combusting the combustible residue after the confirmation inspection is executed, and
  - then, when the residue determination value exceeds the predetermined residue reference value after replacement of one or more components of the exhaust path, forcibly combust the combustible residue.

4. The control apparatus for the internal combustion engine according to claim 2, wherein
- the one or more processors are configured to set the threshold based on a combustion temperature according to the type of the potential residue.

5. The control apparatus for the internal combustion engine according to claim 4, wherein
- information on the type of the potential residue is recorded in advance in the one or more memories for each component of the exhaust path.

6. The control apparatus for the internal combustion engine according to claim 4, wherein
- the one or more processors are configured to
  - set the threshold using information on a pressure in the exhaust path in conjunction with the combustion temperature.

7. The control apparatus for the internal combustion engine according to claim 1, wherein
- the one or more processors are configured to
  - terminate forcibly combusting the combustible residue when an integrated value of the oxygen supply amount after increasing the oxygen supply amount reaches a termination threshold.

8. The control apparatus for the internal combustion engine according to claim 1, wherein
- the one or more processors are configured to
  - increase the oxygen supply amount by increasing an amount of intake air to the internal combustion engine during a fuel cut in which fuel supply to the internal combustion engine is stopped.

9. A method of removing a combustible residue adhered to an exhaust path of an internal combustion engine, the method comprising:

when an exhaust temperature at a predetermined position in the exhaust path or a predetermined reference temperature obtained based on the exhaust temperature has exceeded a threshold during operation of the internal combustion engine, increasing an amount of oxygen to be supplied to the exhaust path to forcibly combust the combustible residue.

10. A non-transitory computer-readable recording medium containing a program applicable to a control apparatus for an internal combustion engine, the program causing, when executed by one or more processors, the one or more processors to implement processing, the processing comprising:

obtaining information on an exhaust temperature at a predetermined position in an exhaust path of the internal combustion engine during operation of the internal combustion engine;

determining whether the exhaust temperature or a predetermined reference temperature obtained based on the exhaust temperature has exceeded a threshold; and when the exhaust temperature or the reference temperature has exceeded the threshold, increasing an amount of oxygen to be supplied to the exhaust path to forcibly combust a residue adhered to the exhaust path.

* * * * *